United States Patent
Lynn et al.

(10) Patent No.: US 10,619,633 B2
(45) Date of Patent: Apr. 14, 2020

(54) DIAPHRAGM COMPRESSOR SYSTEM AND METHOD

(71) Applicant: Other Lab, LLC, San Francisco, CA (US)

(72) Inventors: Pete Lynn, Oakland, CA (US); Saul Griffith, San Francisco, CA (US); Kevin Albert, San Francisco, CA (US); Tim Swift, Clovis, CA (US); Jake Read, Toronto (CA)

(73) Assignee: OTHER LAB LLC, San Francisco, CA (US)

( * ) Notice: Subject to any disclaimer, the term of this patent is extended or adjusted under 35 U.S.C. 154(b) by 15 days.

(21) Appl. No.: 16/015,799

(22) Filed: Jun. 22, 2018

(65) Prior Publication Data
US 2018/0298896 A1    Oct. 18, 2018

Related U.S. Application Data (63) Continuation of application No. 14/577,817, filed on Dec. 19, 2014, now Pat. No. 10,012,229.
(Continued)

(51) Int. Cl.
  *F04B 53/16*    (2006.01)
  *F04B 43/00*    (2006.01)
  (Continued)

(52) U.S. Cl.
  CPC ............ *F04B 53/16* (2013.01); *A61H 1/024* (2013.01); *A61H 1/0237* (2013.01);
  (Continued)

(58) Field of Classification Search
  CPC ....... F04B 43/0045; F04B 45/04; F04B 49/12
  See application file for complete search history.

(56) References Cited

U.S. PATENT DOCUMENTS

| 2,605,957 A | * | 8/1952 | Houston | ............. F04B 39/1073 |
| | | | | 92/99 |
| 3,610,273 A | * | 10/1971 | Russell | ................. F04B 39/108 |
| | | | | 137/513.3 |

(Continued)

FOREIGN PATENT DOCUMENTS

EP    2439410 A1 *    4/2012    ............ F04B 39/121

OTHER PUBLICATIONS

Lynn, "Inflatable Engine," Openthunk, Jun. 5, 2009 [retrieved Dec. 19, 2014], http://openthunk.wikidot.com/inflatable-engine, five pages.
(Continued)

*Primary Examiner* — Patrick Hamo
(74) *Attorney, Agent, or Firm* — Davis Wright Tremaine LLP (57) ABSTRACT

A roll-diaphragm compressor and a roll-diaphragm compressors system, including methods for manufacturing and using same. The roll-diaphragm compressor includes a compressor body having a concave portion that defines a rounded interface wall and an apex portion adjacent to the concave portion that comprises an inlet and outlet port. The roll-diaphragm compressor also includes a flexible roll-diaphragm coupled to the compressor body about a compressor body edge and a compression chamber defined by the concave portion, apex portion and roll-diaphragm. The roll-diaphragm compressor further includes a piston head rigidly coupled to a central portion of the roll-diaphragm and configured to drive the roll-diaphragm to a first configuration where the roll-diaphragm engages the interface wall as part of a compression cycle.

21 Claims, 8 Drawing Sheets

Related U.S. Application Data (60) Provisional application No. 61/918,578, filed on Dec. 19, 2013.

(51) Int. Cl.

| | |
|---|---|
| *F04B 45/053* | (2006.01) |
| *F04B 45/04* | (2006.01) |
| *F04B 49/12* | (2006.01) |
| *F04B 49/22* | (2006.01) |
| *F04B 53/10* | (2006.01) |
| *A61H 1/02* | (2006.01) |
| *B25J 9/00* | (2006.01) |
| *B25J 9/14* | (2006.01) |

(52) U.S. Cl.
CPC ......... *A61H 1/0244* (2013.01); *A61H 1/0274* (2013.01); *A61H 1/0277* (2013.01); *A61H 1/0281* (2013.01); *B25J 9/0006* (2013.01); *B25J 9/142* (2013.01); *F04B 43/0045* (2013.01); *F04B 45/045* (2013.01); *F04B 45/0533* (2013.01); *F04B 49/12* (2013.01); *F04B 49/22* (2013.01); *F04B 53/10* (2013.01)

(56) References Cited

U.S. PATENT DOCUMENTS

| | | | | |
|---|---|---|---|---|
| 3,776,107 | A * | 12/1973 | Molus | F04B 43/0054 92/99 |
| 6,321,561 | B1 * | 11/2001 | Maget | F03G 7/005 417/379 |
| 6,957,952 | B1 * | 10/2005 | Steck | F04B 43/0736 417/395 |
| 7,064,472 | B2 * | 6/2006 | Pelrine | A61M 5/142 310/324 |
| 2008/0181800 | A1 * | 7/2008 | Muschalek | F04B 43/02 417/470 |

OTHER PUBLICATIONS

Zhu, "Making a Parabolic Reflector Out of a Flat Sheet," Solar Cookers International Network, Apr. 2002, retrieved Apr. 12, 2017, http://solarcooking.org/plans/parabolic-from-flat-sheet.htm/, four pages.

\* cited by examiner

DIAPHRAGM COMPRESSOR SYSTEM AND METHOD

CROSS-REFERENCE TO RELATED APPLICATIONS

This application is a continuation of U.S. patent application Ser. No. 14/577,817, filed Dec. 19, 2014, which is a non-provisional of, and claims the benefit of, U.S. Provisional Application No. 61/918,578, filed Dec. 19, 2013. This application is also related to U.S. Non-Provisional application Ser. No. 14/577,524 filed Dec. 19, 2014, which claims the benefit of U.S. Provisional Application No. 61/918,577, filed Dec. 19, 2013. Each of these applications is hereby incorporated herein by reference in their entirety for all purposes.

GOVERNMENT LICENSING RIGHTS

This invention was made with government support under Contract Number: W911QX12C0096 awarded by DARPA under the Maximum Mobility and Manipulation program. The government has certain rights in the invention.

BACKGROUND

Conventional piston-based compressors use mechanical seals to resist leakage at the expense of additional mechanical friction. This type of compressor requires the design of dynamic seals that are typically a significant source of inefficiency, both volumetrically and mechanically, while the piston applies the work to the fluid in a compression chamber.

One existing advancement that has some limited applications is the use of roll-sock seals in air compressors. These designs use a compliant diaphragm material to improve efficiency of the mechanical piston seal by replacing the sliding seal with a rolling contact of the diaphragm on the piston chamber or piston while the piston continues to do the work on the fluid in the compression chamber. Such compressors use roll sock seals to eliminate fluid flow through small gaps internal to the compressor and are not mechanically designed to survive the large forces experienced when exposed to larger areas. As a result, this type of roll sock seal does not reduce the mechanical burden of internal loading and high tolerances that are typical of even standard compressors.

Roll socks are generally constructed from elastomers, and elastomers with fiber reinforcement (ideally but not always axial). The roll sock tube must be sufficiently compliant to fit both the inside cylinder diameter and the outside piston diameter, between which two diameters it rolls. It must also be sufficiently thin and compliant to continuously bend in a full semicircle between the two, without compromising fatigue life and while resisting a useful pressure. These geometrically imposed longevity and environment constraints limit the utility of roll sock seals to relatively specialist applications.

Additionally, diaphragm compressors are known in the art. However, the displacement of such diaphragm compressors is generally small for higher strength lower elastic range more rigid diaphragm materials. Mechanically driven diaphragm pumps can use elastomer diaphragms, at low pressures, and higher strength materials, including steels, at higher pressures. Diaphragm pumps tend to have low power-to-weight ratios due to use of low strength elastic diaphragm materials or low displacement high strength diaphragm materials that operate in bending instead of in tension, as per an ideal thin wall pressure vessel.

Due to the low deflection capability of high strength semi rigid materials that are conventionally used in such systems, diaphragm pumps also tend to have large diameters and short strokes, not only departing substantially from the form of an ideal pressure vessel, but also having low volume, which results in low power. Diaphragms that use highly elastic materials so as to achieve greater strokes and volumes generally do so by using low-strength materials, which reduce power-to-weight ratio, operating pressure, and can reduce longevity or cycle life of such diaphragms.

In view of the foregoing, a need exists for an improved compressor system and method in an effort to overcome the aforementioned obstacles and deficiencies of conventional compressor systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available compressor systems are less than ideal, the novel roll-diaphragm compressor and roll-diaphragm compressor system disclosed herein can prove desirable and provide a basis for a wide range of applications and benefits. For example, various embodiments disclosed herein can provide increased mechanical and volumetric efficiencies for a compressor and/or compressor system with a potential reduction in complexity by reducing high-tolerance parts. Additionally, some disclosed embodiments replace rigid elements with compliant materials, which can reduce weight and increase the power-to-weight ratio of the resulting compressor and/or compressor system. Moreover, embodiments described herein can be configured to operate a substantially higher pressures compared to roll-diaphragm compressors that are known in the art. Such results can be achieved, according to one embodiment disclosed herein, by a roll-diaphragm compressor 100 as illustrated in FIGS. 1a-c and FIGS. 2a-c.

Turning to FIGS. 1a-c and FIGS. 2a-c, the roll-diaphragm compressor 100 comprises a rigid compressor body 110 and a flexible roll-diaphragm 120 that define a compression chamber 130. The roll-diaphragm 120 is driven by a piston head 140 that moves to change the volume of the compression chamber 130 as described in detail herein.

The compressor body 110 defines a concave portion 117 that includes a rounded interface wall 111 that defines a portion of the compression chamber 130 along with the roll-diaphragm 120. The body 110 further comprises an apex portion 116 that includes an inlet port 112 and outlet port 113, with a one-way inlet valve 114 and a one-way outlet valve 215 associated with the inlet port 112 and outlet port 113 respectively. The roll-diaphragm 120 comprises a flexing portion 121 that couples with the body 110 at an edge 122. The roll-diaphragm 120 also comprises a central portion 123 that is coupled to and driven by the piston head 140.

Figure 1A:
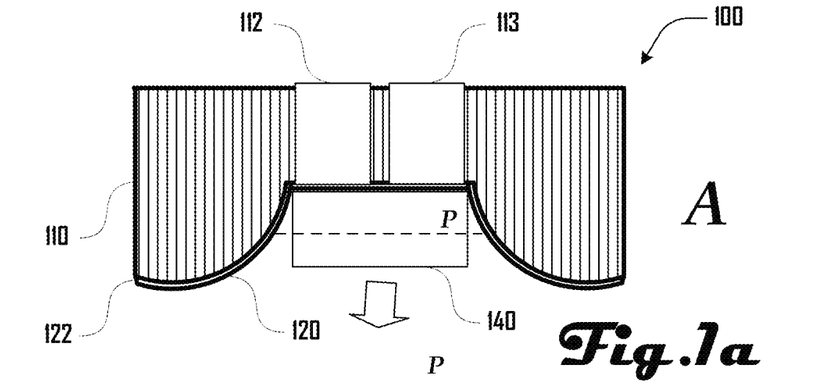
FIGS. 1a-c are exemplary cross sections of a roll-diaphragm compressor in three configurations during an intake stroke of a compressor cycle.
Figure 1B:
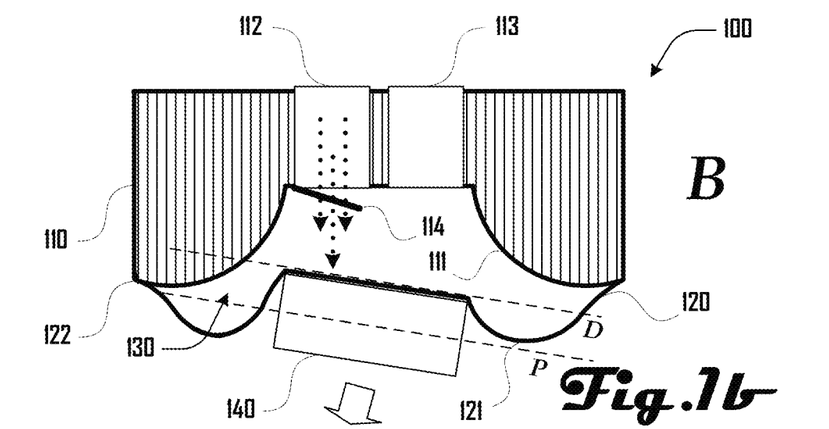
Figure 1C:
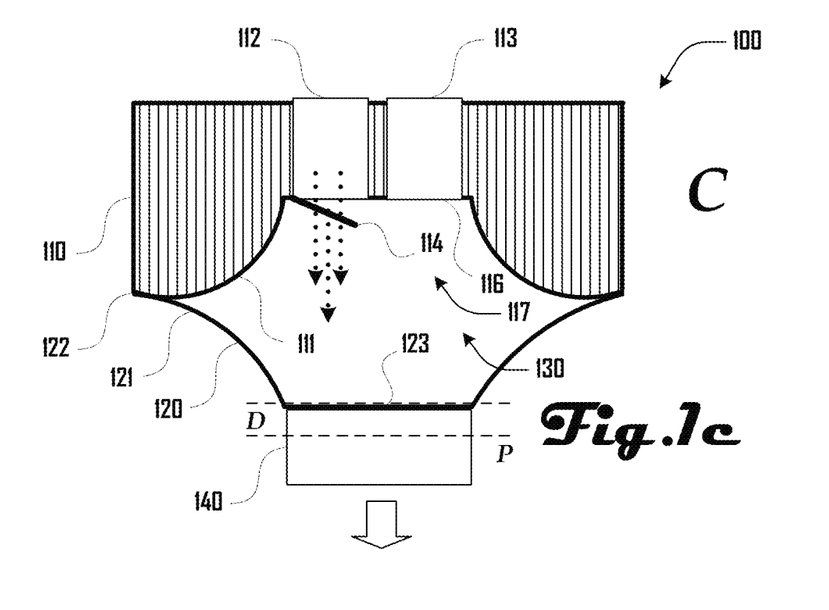
Figure 2A:
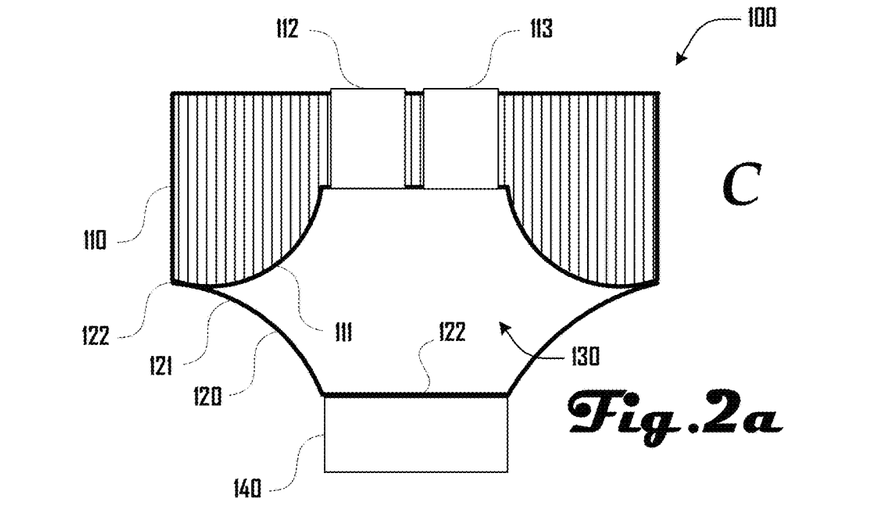
FIGS. 2a-c are exemplary cross sections of the roll-diaphragm compressor of FIGS. 1a-c in three configurations during a discharge stroke of a compressor cycle.
Figure 2B:
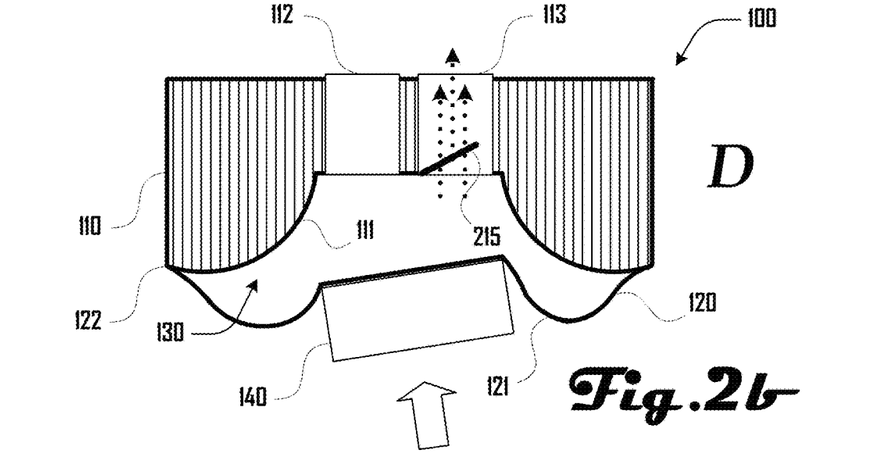
Figure 2C:
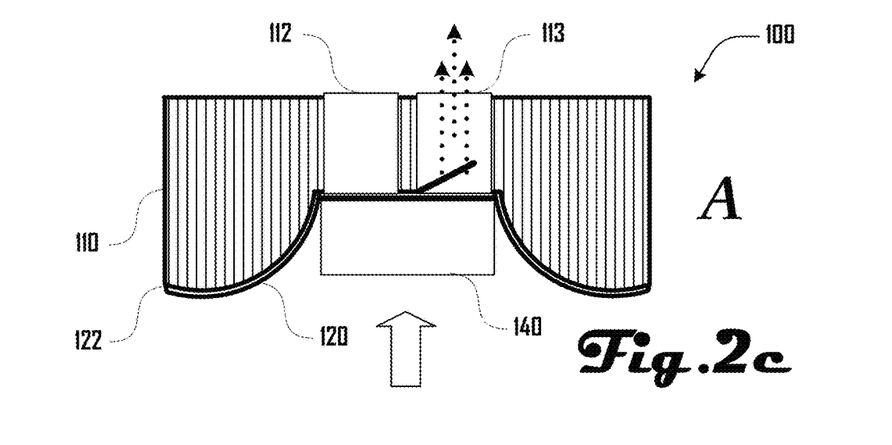

As illustrated in FIGS. 1a-c and FIGS. 2a-c the roll-diaphragm compressor 100 can assume configurations A, B, C and D. FIGS. 1a-c illustrate an intake stroke of the roll-diaphragm compressor 100 that includes configurations A, B and C. FIGS. 2a-c illustrate a discharge stroke of the roll-diaphragm compressor 100 that includes configurations C, D and A.

As shown in FIG. 1a, the intake stroke begins with the flexing diaphragm portions 121 engaging and/or nearly engaging the interface wall 111. The piston head 140 is in a fully extended position with the diaphragm central portion 123 engaging and/or nearly engaging the body 110 about inlet and outlet ports 112, 113. The compression chamber 130 is substantially absent or at its minimum.

The piston head 140 rolls away from the body 110 as shown in FIG. 1b, and the flexing diaphragm portions 121 disengage from and move away from the interface wall 111. The compression chamber 130 increases in volume and generates a vacuum in the compression chamber 130, which draws fluid in from the inlet port 112 and opens the one-way inlet valve 114 so that the fluid is drawn into the compression chamber 130.

As shown in FIG. 1c, the piston head 140 continues away from the body 110 to a position where the compression chamber 130 is at its maximum volume and where the piston head 140 is at its maximum distance from the body 110. The increasing volume of the compression chamber 130 continues to draw fluid into the compression chamber 130 from the inlet port 112 through the one-way inlet valve 114.

Accordingly, as shown in FIGS. 1a-c, the roll-diaphragm compressor 100 can draw fluid into the compression chamber 130 by moving from configuration A to B to C, where the piston head 140 moves away from the body 110 such that the roll-diaphragm 120 disengages and moves away from the interface wall 111. The compression chamber 130 increases in volume and fluid is drawn into the compression chamber 130 through the inlet port 112 and via the open one-way inlet valve 114.

FIGS. 2a-c illustrate a discharge stroke of the roll-diaphragm compressor 120 that includes configurations C, D and A. As shown in FIG. 2a, the piston head 140 begins in a position where the compression chamber 130 is at its maximum volume and where the piston head 140 is at its maximum distance from the body 110. Fluid is at maximum capacity within the compression chamber 130 and one-way valves 114, 215 are closed.

As shown in FIG. 2b, the piston head 140 begins to rollably move toward the body 110, which generates positive pressure within the compression chamber 130. This positive pressure opens the one-way outlet valve 215 and allows fluid to leave the compression chamber 130 via the outlet port 113.

The piston head 140 continues toward the body 110 until the roll-diaphragm 120 engages and/or nearly engages the interface wall 111. The compression chamber 130 is at its minimum volume and all or nearly all of the fluid is expelled from the compression chamber 130 via the open one-way outlet valve 215 and through the outlet port 113.

Accordingly, as shown in FIGS. 2a-c, the roll-diaphragm compressor 100 can expel fluid from the compression chamber 130 by moving from configuration C to D to A, where the piston head 140 moves toward from the body 110 such that the roll-diaphragm 120 moves toward and engages the interface wall 111. The compression chamber 130 decreases in volume and fluid leaves the compression chamber 130 through the outlet port 113 and via the open one-way outlet valve 215. In contrast to conventional compressor systems, the present embodiment leave little if any dead space (i.e., volume remaining in the compression chamber 130 at the end of the discharge cycle), which can substantially improve compressor efficiency. In various embodiment, the flexible roll-diaphragm 120 pressing against the interface wall 111 provides the benefit of forcing all or nearly all of the fluid out of the compression chamber 130 during the discharge stroke.

In various embodiments, a convex rounded interface wall 111 as shown herein can be beneficial because it can minimize the dead volume in the compression chamber 130 to improve compression efficiency of the roll-diaphragm compressor 100 as discussed above. In other words, because the roll-diaphragm 120 can conform to and engage with the curvature of the interface wall 111 and the inlet and outlet ports 112, 113, as shown in configuration A (FIGS. 1a and 2c) the volume of the compression chamber 130 can be close to or nearly zero when the roll-diaphragm compressor 100 is in configuration A. This can be beneficial because all or nearly all of the fluid drawn into the compression chamber 130 is expelled during a compression cycle instead of a substantial amount of fluid remaining in the compression chamber 130, which decreases compressor efficiency.

Additionally, in various embodiments, the interface wall 111 can be designed to provide axial progression of the rolling contact between the roll-diaphragm 120 and interface wall 111 throughout the stroke of the roll-diaphragm 120. In various embodiments, the size, shape and contour of the interface wall 111 can be designed to shape the flow characteristics of the fluid out of the compression chamber 130 and through the outlet port 113. Accordingly, although certain rounded convex embodiments of the interface wall 111 are disclosed herein, further embodiments can include any suitable contour, slope, size or shape. Additionally, in some embodiments, the interface wall 111 can comprise a rigid material such as metal, a plastic, or the like. However, in other embodiments, the interface wall 111 can comprise a compliant deformable material such as rubber, or the like.

In various embodiments, the roll-diaphragm 120 is configured to be in a low energy state such that the roll-diaphragm 120 is loaded solely or primarily through tension as shown in FIGS. 1b and 2b. The roll-diaphragm 120 can also be configured such that it maximizes the use of rolling contact as opposed to a sliding contact with the interface wall 111 as the roll-diaphragm 120 moves through the stroke of the compressor (i.e., cycles between configurations A-D). In some embodiments, it may not be possible to completely remove sliding contact between the roll-diaphragm 120 and interface wall 111, but it can be beneficial to design such embodiments to minimize the sliding friction experienced by the roll-diaphragm 120.

As discussed herein, the term roll and similar terms (e.g., rolling, rollably, rollingly, or the like) can refer to a rolling movement of the roll-diaphragm 120 and/or piston head 140 during a compression cycle. For example, as illustrated in FIGS. 1a-c, the diaphragm central portion 123 can have an axis D and the piston head 140 can have an axis P. In various embodiments, the D and/or P axis may modulate or roll at various positions in a compression cycle, which can be beneficial as described herein.

Additionally, the term roll and similar terms (e.g., rolling, rollably, rollingly, or the like) can refer to the manner in which the roll-diaphragm 120 engages the interface wall 111. In other words, the roll-diaphragm 120 can roll onto the interface wall 111 as opposed to slidably engaging the interface wall 111

Figure 3:
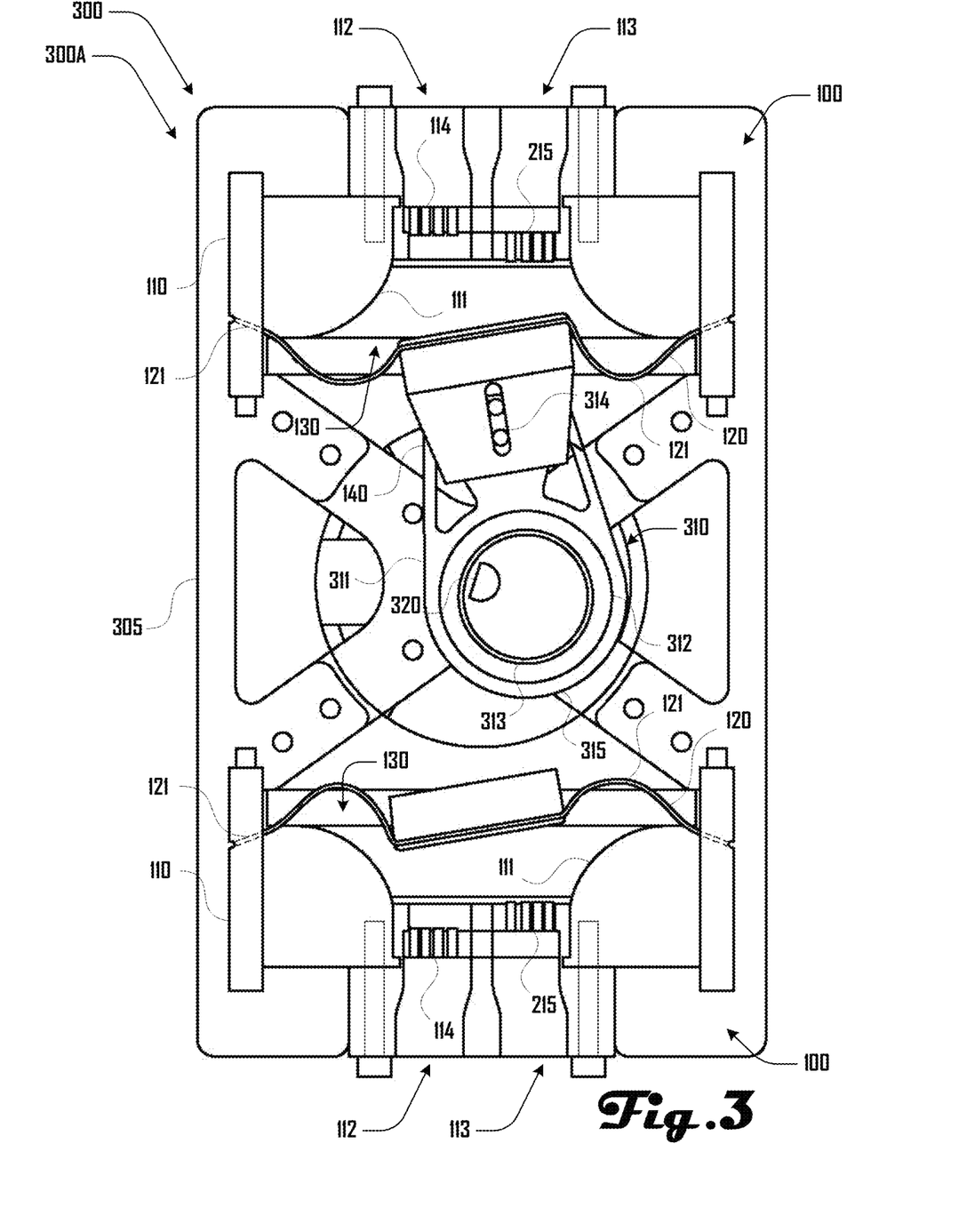
FIG. 3 is an exemplary cross section of a roll-diaphragm compressor system that includes a pair of the roll-diaphragm compressors illustrated in FIGS. 1a-c and FIGS. 2a-c.

FIG. 3 is an exemplary cross section of a roll-diaphragm compressor system 300 that includes a pair of the roll-diaphragm compressors 100 illustrated in FIGS. 1a-c and FIGS. 2a-c. As shown in this embodiment 300A, the system 300 includes an architecture 305 on which the roll-diaphragm compressors 100 are disposed opposing each other. Each roll-diaphragm compressor 100 is associated with a piston assembly 310 that comprises a piston body 311, a bearing 312, a crank 313 and a piston head 140. The piston head 140 is coupled at a first end 314 of the piston body 311. The bearing 312 resides within the piston body 311 at a second end 315, with the crank 313 rotatably residing within the bearing 312. As discussed in more detail herein, the crank 313 is rotatably driven by a crank shaft 320, which rolls the piston head 140 toward and away from the body 110 as described above.

Figure 4:
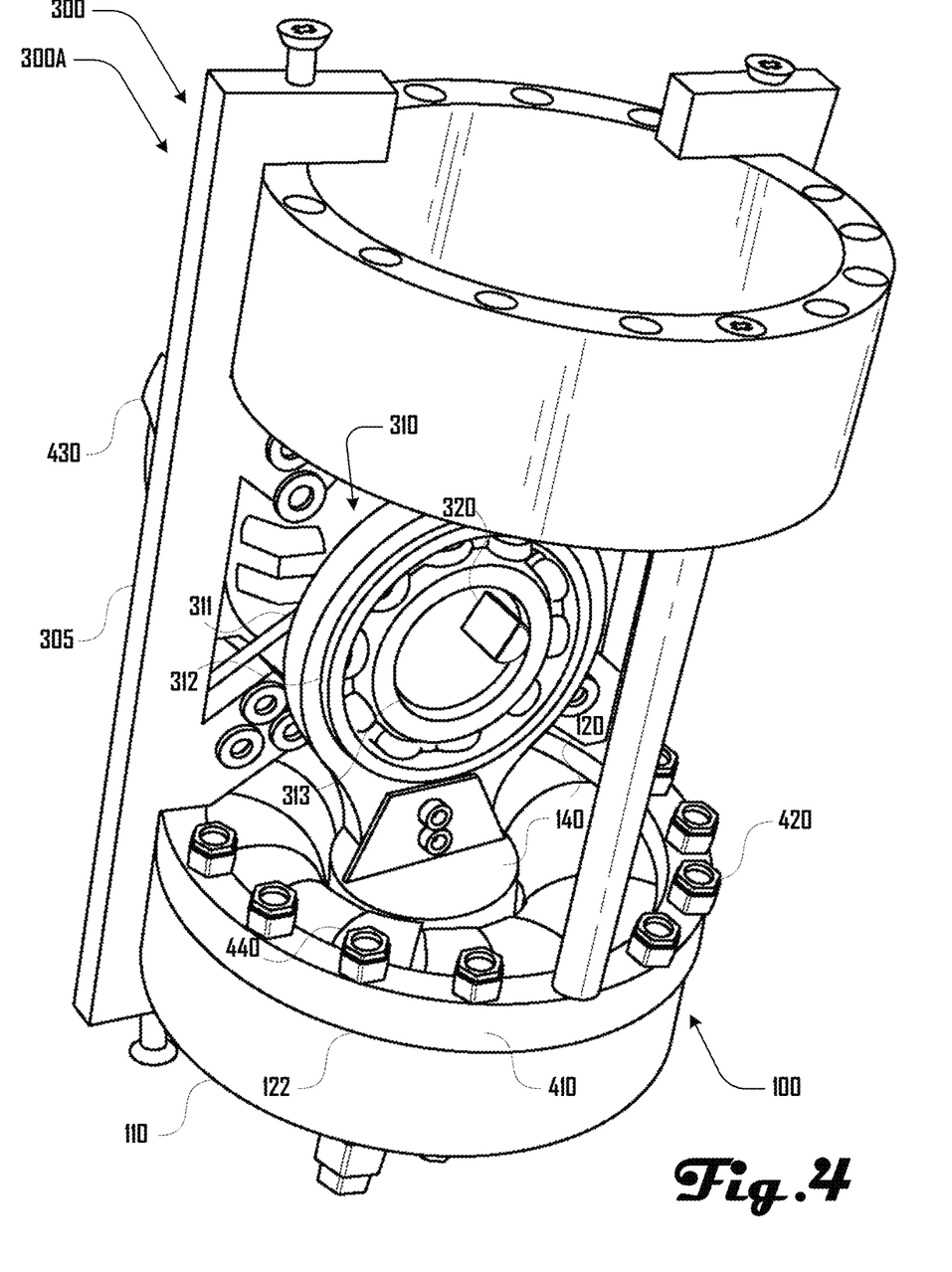
FIG. 4 is an exemplary perspective view of the roll-diaphragm compressor system of FIG. 3.

FIG. 4 is an exemplary perspective view of a portion of the roll-diaphragm compressor system 300 of FIG. 3 showing the detail of one of the roll-diaphragm compressors 100. As shown in FIG. 4, the roll-diaphragm compressor 100 includes a retaining ring 410 that couples the roll-diaphragm 120 to the body 110 at the diaphragm edge 122. In other words, the retaining ring 410 and body 110 sandwich the roll-diaphragm edge 122 such that the roll-diaphragm 120 is held securely and creates a strong seal with body 110 such that fluid is unable to escape the compression chamber 130 (shown in FIG. 3) at this coupling. The retaining ring 410 is held in place via a plurality of bolts 420 that extend through the body 110.

FIG. 4 also illustrates that the compressor system 300 can comprise a motor 430 that rotates the crank shaft 320, which in turn drives the piston head 140 and roll-diaphragm 120 as described above. Additionally, as illustrated in FIG. 4, in some embodiments, the roll-diaphragm 120 can comprise seams 440, which are described in more detail herein.

Figure 5:
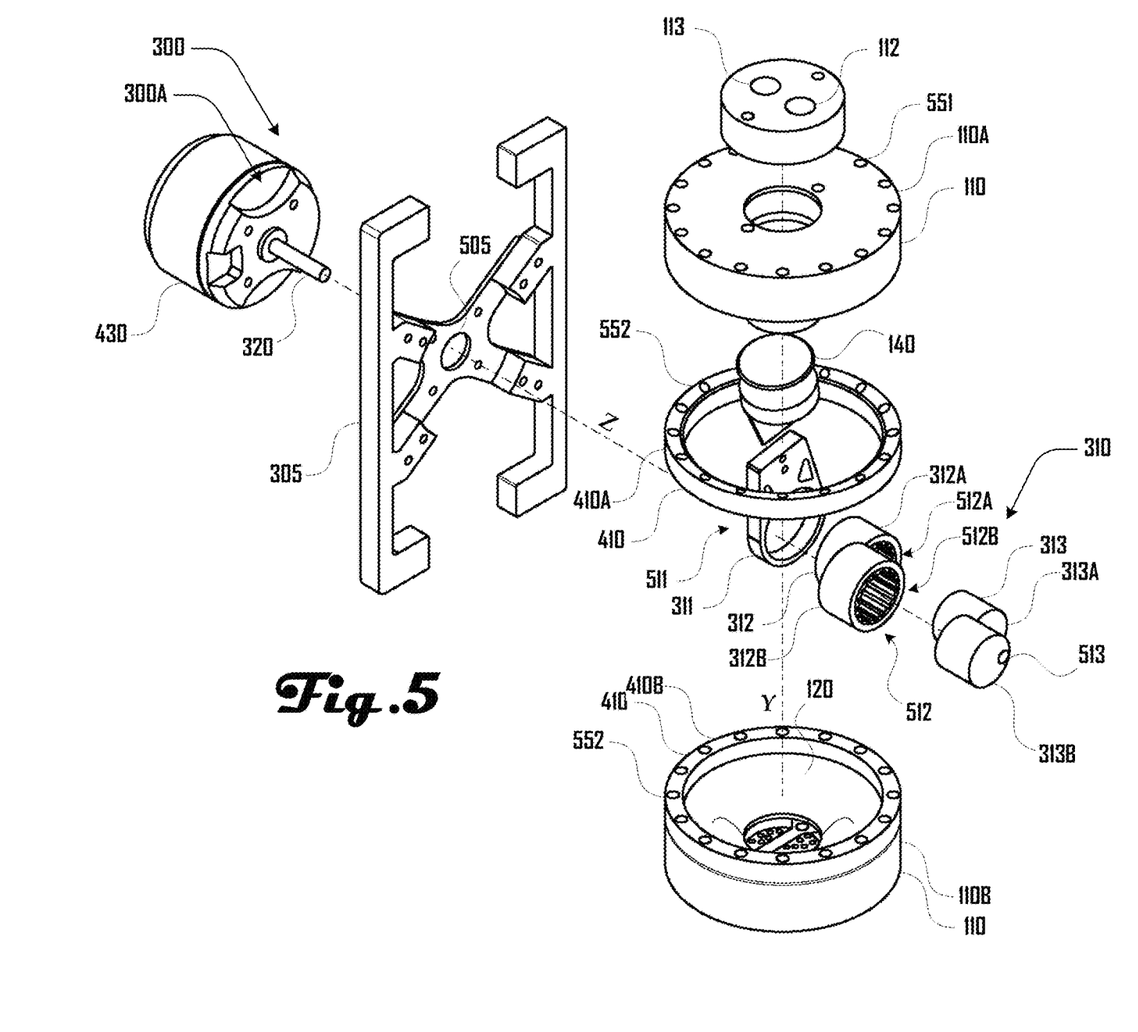
FIG. 5 is an exemplary exploded view of the roll-diaphragm compressor system of FIGS. 3 and 4.

FIG. 5 is an exemplary exploded view of a portion of roll-diaphragm compressor system 300 of FIGS. 3 and 4. As shown in FIG. 5, the system 300 includes a first and second crank 313A, 313B that are offset about a crank-slot 513 through which the crank shaft 320 of the motor 430 is configured to extend as illustrated by axis Z. The first and second crank 313A, 313B respectively reside within a first and second bearing-slot 512A, 512B defined by a first and second bearing 312A, 312B. For example, the first crank 313A, resides within the first bearing slot 512A of the first bearing 312A and the second crank 313B, resides within the second bearing slot 512B of the second bearing 312B.

The first bearing 312A resides within a piston slot 511 of a first piston body 311. The second bearing 312B resides within a second piston (not shown in FIG. 5 for purposes of clarity). When assembled, the crank shaft 530 extends along axis Z through an aperture 505 of the architecture 305 and extends through the crank-slot 513 defined by the first and second crank 313A, 313B. FIG. 5 also illustrates body bolt holes 551 that extend through each body 110 and retainer ring bolt holes 522 that extend through each retainer ring 410. As shown in FIG. 5, a first retainer ring 410A is associated with a first body 110A and a second retainer ring 410B is associated with a second body 110B.

Figure 6:
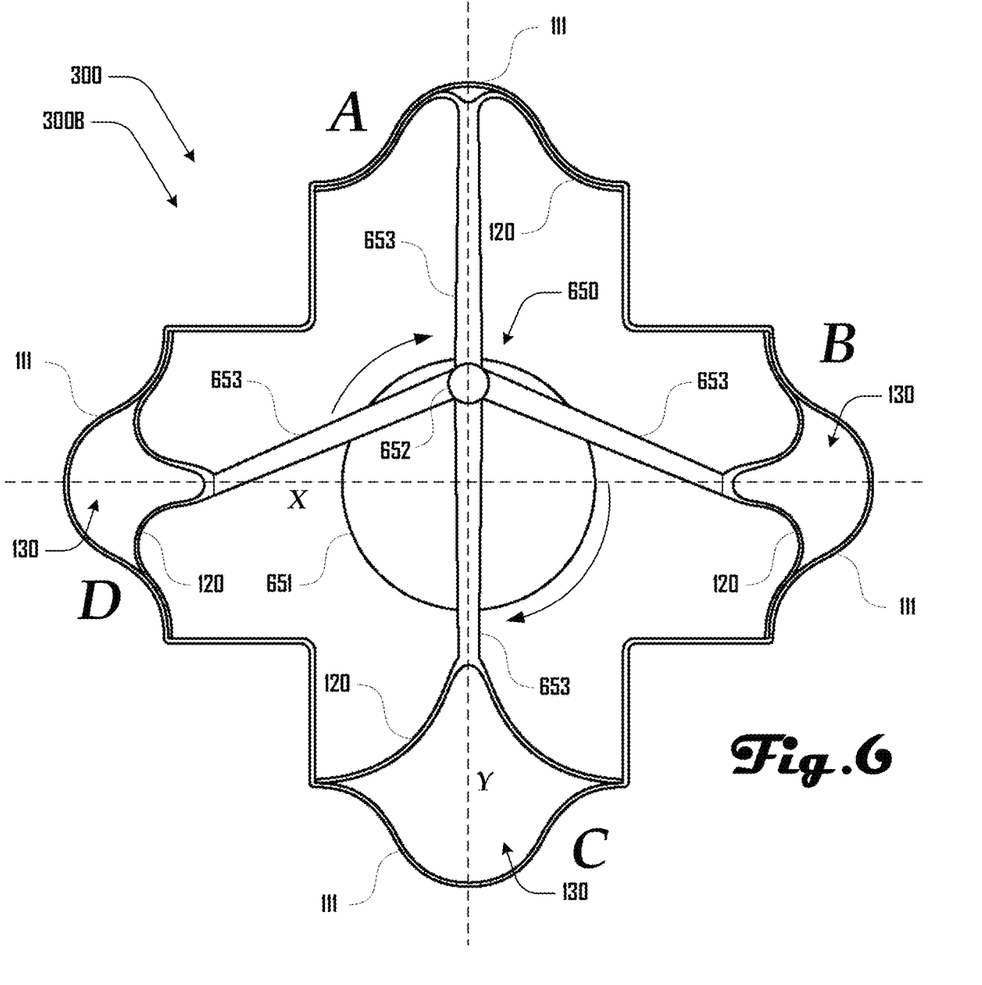
FIG. 6 is an exemplary cross section view of another embodiment of a roll-diaphragm compressor system that includes four roll-diaphragm compressors.

FIG. 6 is an exemplary cross section view of another embodiment 300B of a roll-diaphragm compressor system 300 that includes four roll-diaphragm compressors 100. As discussed herein, each roll-diaphragm compressor 100 comprises a roll-diaphragm 120 that moves toward and engages interface wall 111 and moves away from and disengages the interface wall 111 in various configurations including configurations A, B, C and D. The system 300B further includes a wheel assembly 560 that comprises a crank-wheel 651, which rotates about an axis that is orthogonal to the junction of axes X and Y. A pin 652 is coupled to the crank-wheel 651 at a location apart from the junction of the axes X and Y. A plurality of piston shafts 653 are rotatably coupled to the pin 652 and to a respective roll-diaphragm 120. Accordingly, rotation of the crank-wheel 651 drives the respective roll-diaphragms 120 in staggered configurations as illustrated in FIG. 6.

Figure 7:
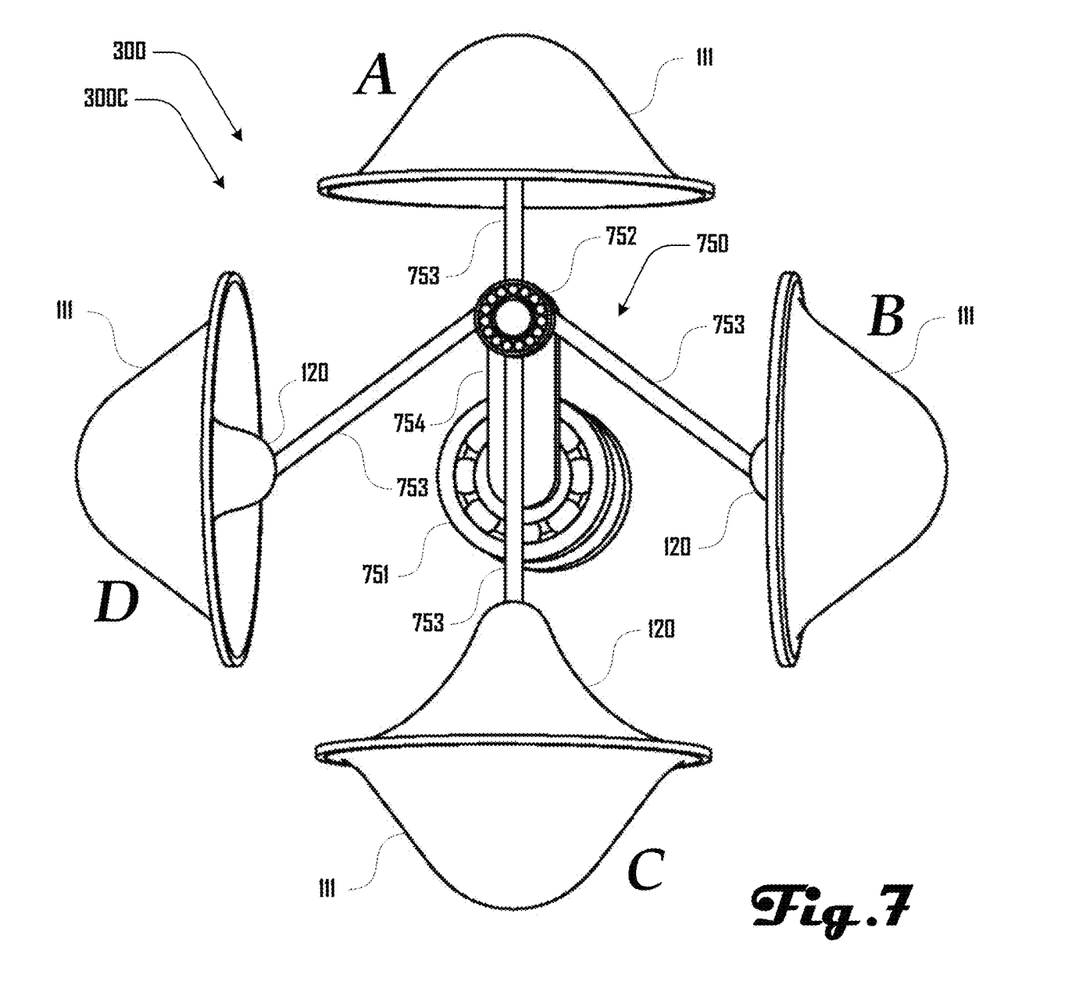
FIG. 7 is an exemplary cross section view of a further embodiment of a roll-diaphragm compressor system that includes four roll-diaphragm compressors.

FIG. 7 is an exemplary perspective view of a further embodiment 300C of a roll-diaphragm compressor system 300 that includes four roll-diaphragm compressors 100. In contrast to the embodiment 300B depicted in FIG. 6, the roll-diaphragms 120 of embodiment 300C of FIG. 7 are driven by a crank-arm assembly 750 a crank-shaft 751 that rotates a crank-arm 754 on which a piston-hub 752 is rotatably coupled at a distal end. The piston-hub 752 drives the plurality of piston shafts 753.

In one embodiment, the roll-diaphragm compressor 300A can operate in a configuration where an internal crank case pressure is higher than the maximum compression chamber pressure such that the roll-diaphragm 120 is inverted and the connecting rod 753 can operate purely, or nearly purely, in tension. Such an embodiment can improve volumetric efficiency because internal crank case pressure pushes the roll-diaphragm 120 against the interface wall 111, preventing dead volume and reducing the required tensile force on the roll-diaphragm 120. Additionally, the connecting rod 120 which can be operating purely or nearly purely in tension, can be compliantly attached to the central crank bearing 752 without highly loaded (high friction power loss) secondary pivot systems as used on a traditional radial pump/engine mechanical design.

Additionally, although FIGS. 3-7 depict one or more pairs of opposing roll-diaphragm compressors 100 that are aligned along a common axis, further embodiment can include any suitable plurality of roll-diaphragm compressors 100 that are not aligned along a common axis. For example, one embodiment can include an architecture that holds a first, second and third roll-diaphragm compressor 100 in an offset opposing configuration without any the diaphragm compressors 100 being aligned in a common axis. In such an embodiment, the first, second and third roll-diaphragm compressor 100 can be in an equilateral triangular configuration.

Figure 8:
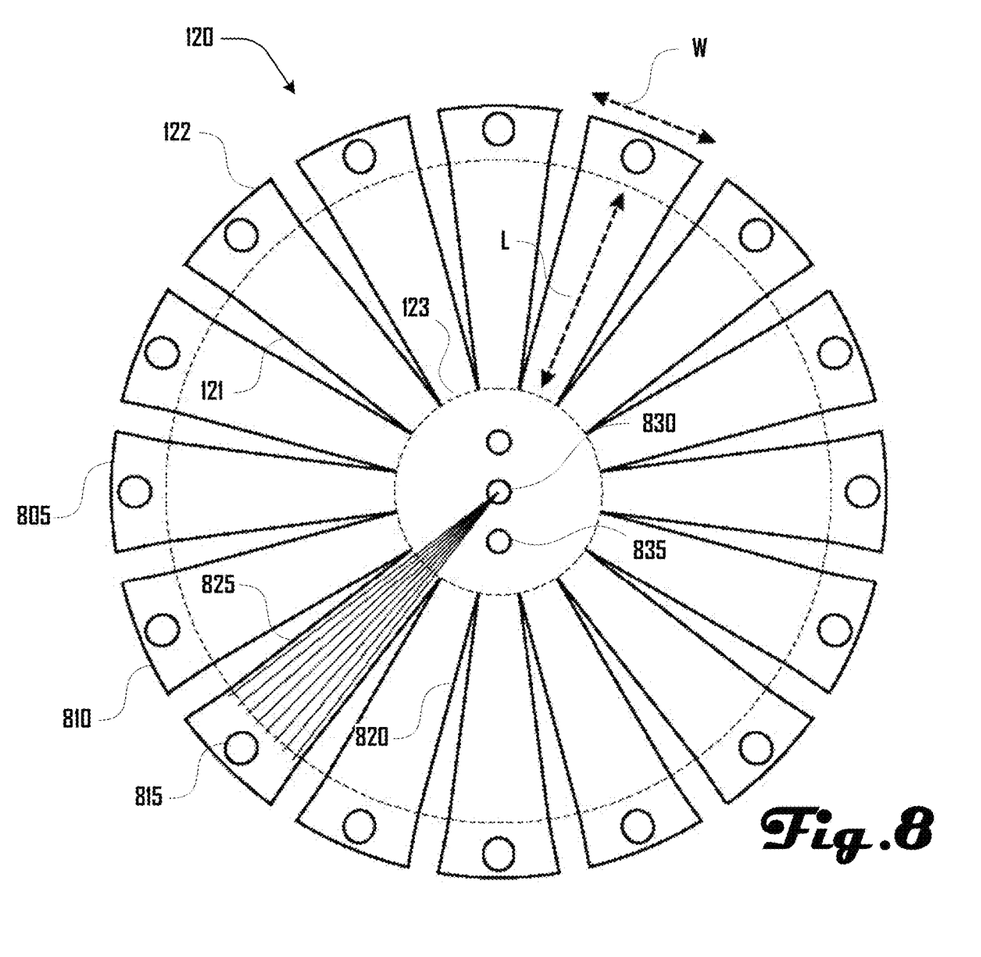
FIG. 8 is a front view of a roll-diaphragm disc in accordance with an embodiment.

FIG. 8 is a front view of a roll-diaphragm 120 in accordance with an embodiment. The roll-diaphragm 120 comprises a plurality of petals 805 that extend from central portion 123 to an end 810 that has a width W. Each petal 805 includes a flexing portion 121 and an end portion 122. Flex portions have a length L, and as discussed herein, the flexing portions 121 flex during the compression cycle of the roll-diaphragm compressor 100. The end portions 122 are held between the body 110 and retaining ring 410 (see e.g., FIGS. 4 and 5). In some embodiments, the bolts 420 (shown in FIG. 4) can extend through a hole 815 defined by the end portion 122.

The central portion 123 can comprise one or more coupling hole 830 that are configured for coupling with the piston head 140 (see e.g., FIG. 3). Although coupling holes 830 are illustrated in this embodiment, in some embodiments, coupling holes 830 can be absent or other coupling structure can be provided in place of coupling holes 830.

Each of the leaves 805 can comprises side edges 820 that extend from the central portion 123 to the end 810. Edges 820 of adjoining leaves 805 can be coupled together to generate the concave or convex dome profile of the roll-diaphragm 120 as shown and described herein. Such coupling can comprise welding, an adhesive, a mechanical coupling, or the like. For example, coupling the edges 820 of adjoining leaves 805 can generate the diaphragm seams 440 illustrated in FIG. 4. Such a configuration can be beneficial because the roll-diaphragm 120 can be cut out of a single flat piece of stock material and formed into a convex/concave dome shape instead of requiring that the roll-diaphragm be constructed in a convex/concave dome shape.

In various embodiments, the roll-diaphragm 120 can comprise a plurality of radial tensile elements 825 that extend from a central location 830 and extend the length L of the leaves 805. (For purposes of clarity, radial tensile elements 825 are shown in only one leaf 805, but in various embodiments, a plurality of the leaves 805 can comprise radial tensile elements 825. In some embodiments, the tensile elements 825 can comprise various suitable materials including polymers, high strength fibers, metals, or the like, which can be configured to assist with the tensile loads experienced by the roll-diaphragm 120. One preferred embodiment of the roll-diaphragm 120 comprises a one-piece molded radial fiber reinforced elastomer similar in form, construction, mechanical properties, and longevity to a fiber reinforced drive belt which serves as both the impermeable layer and tensile element.

In various embodiments the roll-diaphragm 120 can comprise a fluid-impermeable material that can comprise an elastic membrane, a polymer film, a material having high elasticity shape memory, an alloy, a corrugated metal and/or an elastic coating. The roll-diaphragm 120 can be integrated to be loaded primarily in radial tension. Accordingly, in some embodiments, it can be beneficial for the roll-diaphragm 120 to exhibit anisotropic material properties to provide for radial strength but allow circumferential compliance to allow for rolling behavior.

In some embodiments, the roll-diaphragm 120 can comprise a single homogeneous material, a plurality of stacked layers, or a composite material. In embodiments having a plurality of layers, such layers can serve a number of different functions including but not limited to protective coatings, high temperature layers, impermeability layers, structural layers, cooling layers, or the like. Such layers may be integrated into a single component roll-diaphragm, installed as various non-integral sheets, or as a combination thereof.

In some embodiments, the roll-diaphragm 120 can be constructed of multiple layers that serve different functions. Such layers may or may not be adhered together. For example, one layer might consist of radial high tensile strength elements (with associated protective coatings or infused matrices), covered by an elastomeric layer for impermeability, with yet another surface coating for wear resistance. In one embodiment, the roll-diaphragm 120 can be directly molded using an anisotropic fiber reinforced elastomer. Fiber reinforced drive belts, including timing belts, provide one example of a molded construction that can be suitable in some embodiments. Fiber reinforcement can comprise glass fiber, aramid fiber, carbon fiber, metallic wire, fibers and monofilaments of many polymer types, and the like. The elastomer can comprise rubber, polyurethane, silicone rubber, polyimide, polytetrafluoroethylene (Teflon), or the like, as dictated by the desired properties.

In various embodiments, the roll-diaphragm 120 configuration of FIG. 8 can be beneficial because it can provide for the piston assembly 310 (see e.g., FIGS. 3, 4 and 5) being rigidly coupled to the roll-diaphragm 120 as shown in FIGS. 1a-c, 2a-c and 3, instead of being contained in a pivot or other configuration. This can allow the roll-diaphragm 120 to act as a flexure and accommodate for some misalignment while reducing the number of parts and complexity of the roll-diaphragm compressor 100. In some embodiments, various portions of the piston assembly 310 can have their motion constrained mechanically through the use of a linkage mechanism, or the like, that leaves the roll-diaphragm 120 to accommodate primarily for angular misalignment.

Although some embodiments of the roll-diaphragm compressor system 300 include an arbitrary fixed-stroke piston design, roll-diaphragm compressor system 300, in further embodiments, can include any suitable compressor configuration, including radial piston, axial piston, rhombic drive, wobble plate, inline piston compressors, and the like. In fact, the embodiments discussed herein can be configured to improve the efficiencies of such compressor architectures. Additionally, the embodiments described herein can be beneficial over existing systems by providing improvements in mechanical and volumetric efficiencies, and can provide enhanced efficiency and power density on a thermodynamics basis.

Although specific embodiments of a roll-diaphragm compressor 100 and roll-diaphragm compressor system 300 are shown herein, such example embodiments should not be construed to be limiting on roll-diaphragm compressors 100 and roll-diaphragm compressor systems 300 that are within the scope and spirit of the present invention. Accordingly, various suitable modifications can be made to example roll-diaphragm compressors 100 and roll-diaphragm compressor systems 300 based on, and to satisfy or address, a specific compressor need.

For example, in one embodiment a roll-diaphragm compressor 100 and/or roll-diaphragm compressor system 300 can be configured for operation in a closed pneumatic system at an elevated low pressure state. In such an embodiment, the structural integrity of the roll-diaphragm 120 can primarily be a function of the pressure difference between higher pressure fluid inside the compression chamber 130 and the lower pressure fluid outside of the compression chamber 130, and not the absolute pressure of the compression chamber 130. In such an embodiment, one-way valves 112, 113 can be integrated directly into the roll-diaphragm 120 to allow fluid to be sucked into the compression chamber 130 through the roll-diaphragm 120 during fluid intake.

In another embodiment, a roll-diaphragm compressor 100 and/or roll-diaphragm compressor system 300 can be configured such that portions external to the compression chamber 130 are pressurized to a pressure that is greater than the pressure of the compression chamber 130. In such an embodiment, the low energy state for the roll-diaphragm 120 can be a configuration where the compression chamber is at a maximum volume as illustrated in FIGS. 1c and 2a. Such an embodiment can provide the benefit of placing the piston assembly 310 in tension at all times and allowing for a portion of the piston assembly 310 to comprise alternative materials and/or structures such as high strength fabric or metal wire.

Additionally, such an embodiment can be beneficial because it can assist with evacuating the pumping volume within the compression chamber 130 by forcing the roll-diaphragm 120 against the interface wall 111. As a result, such an embodiment can be designed to minimize the dead volume of fluid remaining in the pumping volume at full compression which can improve compression efficiencies of such a roll-diaphragm compressor 100 and/or roll-diaphragm compressor system 300.

Further embodiments can be configured to provide a variable stroke or the hydraulic equivalent to a variable displacement. Such a diaphragm-based embodiment can interface with various standard variable displacement systems, including a variable swashplate angle, variable valve timing, or eccentricity of a cam plate in a radial piston pump. Such an embodiment can also provide for novel types of variable displacement.

For example, one embodiment can include variation of the piston assembly stroke through an actuator that modifies the geometry of a linkage mechanism that constrains the motion of the piston assembly 132. Other embodiments can vary the geometry of the interface wall 111 to actively deform the volume of the compression chamber 130. For example, in one embodiment, a mechanical actuator cam can move a semi-compliant interface wall 111. In another embodiment, the interface wall 111 can comprise a compliant roll-diaphragm that can be back-pressurized to manipulate the geometry of the semi-compliant interface wall 111. Still further embodiments can be configured to modify the timing of at least one of the inlet valve 114 and outlet valve 215 to provide for variable displacement (Shown in FIGS. 1a-c, 2a-c and 3).

In still further embodiments, a roll-diaphragm compressor 100 and/or roll-diaphragm compressor system 300 can be used as a motor. In such embodiments there can be a direct relationship between pressure and output position when the roll-diaphragm compressor 100 and/or roll-diaphragm compressor system 300 is exposed to a constant load. This may be beneficial because such an embodiment can enable the roll-diaphragm compressor 100 and/or roll-diaphragm compressor system 300 to be used as a motor at low cost because certain embodiments may only need a pressure sensor to observe and potentially control the position of the constant output load.

Such embodiments can be beneficial because they can allow such a roll-diaphragm compressor 100 and/or roll-diaphragm compressor system 300 to be incorporated into a relatively small yet powerful power unit for mobile pneumatic operation. For example, such embodiments can be configured for use as a pneumatic power generation unit as a mobile power unit for an untethered orthotic system that runs off of a fluid-power architecture. Another embodiment can be configured for use as a mobile power unit for a mobile robotic manipulation system that operates using fluid power. Similar embodiments exist for other mobile robotic platforms that operate using fluid power. One example of such a system is described in copending U.S. patent application Ser. No. 14/577,524 filed Dec. 19, 2014, which claims the benefit of U.S. Provisional Application No. 61/918,577, filed Dec. 19, 2013.

Additionally, although various example embodiments described herein are configured to compress a pneumatic fluid, such example embodiments should not be construed to limit the scope and spirit of the present invention. For example, some embodiments can be used with any suitable fluid (e.g., water, oil, air, or oxygen). In other words, the present embodiments can be configured for use with both pneumatic and hydraulic systems. Further embodiments can be configured as a pump/compressor and/or motor in a given system. This includes both gaseous and liquid fluids as well as fluids that contain mixtures of multiple phases of matter such as, but not limited to, a combination of gaseous and liquid, or liquid and solids. Still further embodiments can be configured for use in a combustion-based system.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A roll-diaphragm compressor comprising:
   a compressor body including:
      a concave portion that defines a rounded convex interface wall; and
      a planar apex portion adjacent to the concave portion that comprises an inlet and outlet port;
   a flexible roll-diaphragm coupled to the compressor body about a compressor body edge and defining a dome profile, the roll-diaphragm defining a fluid impermeable membrane and comprising a plurality of elongated tensile elements extending radially from a diaphragm central portion toward an edge of the roll-diaphragm, the plurality of elongated tensile elements having a greater tensile strength than the fluid impermeable membrane to reinforce the fluid impermeable membrane;
   a compression chamber defined by the concave portion, the planar apex portion and roll-diaphragm; and
   a piston head rigidly coupled to a central portion of the roll-diaphragm at a planar top face of the piston head and defining a planar central portion of the roll-diaphragm, the piston head configured to drive the roll-diaphragm in a rolling cycle motion including:
      driving the roll-diaphragm in a first stage of a compression cycle to have rolling engagement of the roll-diaphragm against the rounded convex interface wall with the compression chamber having a first volume, and
      driving the roll-diaphragm in a second stage of the compression cycle with compression chamber having second volume that is less than the first volume and close to or nearly zero, with the roll-diaphragm substantially fully engaged with the rounded convex interface wall and with the planar top face of the piston head and the planar central portion of the roll-diaphragm residing within the planar apex portion of the compression body.

2. The roll-diaphragm compressor of claim 1, wherein the roll-diaphragm has anisotropic material properties that provide for radial strength while providing circumferential compliance to allow for the rolling cycle motion.

3. The roll-diaphragm compressor of claim 1, wherein an operating pressure external to the compression chamber is maintained at a greater pressure than a maximum pressure generated inside the compression chamber during the compression cycle.

4. A roll-diaphragm compressor system consisting essentially of:
   a first roll-diaphragm compressor as described claim 1;
   a second roll-diaphragm compressor as described in claim 1;
   architecture that holds the first and second compressor in an opposing configuration along a common axis; and
   a piston assembly disposed between the first and second roll-diaphragm compressor configured to drive a respective first and second piston head of the first and second roll-diaphragm compressor,
   wherein said piston assembly comprises a first and second crank that are offset from each other about a central crank-shaft axis, the first and second crank configured to drive the first and second roll-diaphragm compressor in staggered respective compression cycles.

5. The roll-diaphragm compressor of claim 1, wherein the roll-diaphragm is defined by a plurality of leaves that extend from a diaphragm central portion to a diaphragm edge, each leaf having side edges that are coupled with side edges of adjoining leaves to generate a dome profile of the roll-diaphragm, and
   wherein said leaves comprise tensile elements that extend radially from the diaphragm central portion, the tensile elements having anisotropic material properties that provide for radial strength while providing circumferential compliance to allow for the rolling cycle motion.

6. A roll-diaphragm compressor comprising:
   a compressor body including:
      a concave portion that defines a rounded convex interface wall; and
      a planar apex portion adjacent to the concave portion that comprises an inlet and outlet port;
   a flexible roll-diaphragm coupled to the compressor body about a compressor body edge;
   a compression chamber defined by the concave portion, the planar apex portion and roll-diaphragm; and
   a piston head rigidly coupled to a central portion of the roll-diaphragm and configured to drive the roll-diaphragm to a first configuration where the roll-diaphragm engages the rounded convex interface wall as part of a compression cycle.

7. The roll-diaphragm compressor of claim 6, wherein the piston head corresponds to and is configured to reside within the planar apex portion when the roll-diaphragm is in the first configuration.

8. The roll-diaphragm compressor of claim 6, wherein the roll-diaphragm rollingly engages the rounded convex interface wall as part of the compression cycle.

9. The roll-diaphragm compressor of claim 6, wherein the piston head is configured to drive the roll-diaphragm in a rolling cycle motion.

10. The roll-diaphragm compressor of claim 6, wherein an operating pressure external to the compression chamber is maintained at a greater pressure than a maximum pressure generated inside the compression chamber during the compression cycle.

11. The roll-diaphragm compressor of claim 6, wherein the roll-diaphragm defines a dome profile.

12. The roll-diaphragm compressor of claim 6, wherein the roll-diaphragm comprises tensile elements that extend radially from a diaphragm central portion.

13. The roll-diaphragm compressor of claim 6, wherein the roll-diaphragm is defined by a plurality of leaves that extend from a diaphragm central portion to a diaphragm edge, each leaf having side edges that are coupled with side edges of adjoining leaves to generate a dome profile of the roll-diaphragm.

14. The roll-diaphragm compressor of claim 13, wherein said leaves comprise tensile elements that extend radially from the diaphragm central portion.

15. A roll-diaphragm compressor system consisting essentially of:
   a first roll-diaphragm compressor as described claim 6, and
   a second roll-diaphragm compressor as described in claim 6.

16. The roll-diaphragm compressor system of claim 15, further comprising:
   an architecture that holds the first and second compressor in an opposing configuration along a common axis; and
   a piston assembly disposed between the first and second roll-diaphragm compressor configured to drive a respective first and second piston head of the first and second roll-diaphragm compressor.

17. The roll-diaphragm compressor of claim 16, wherein said piston assembly comprises a first and second crank that are offset from each other about a central crank-shaft axis, the first and second crank configured to drive the first and second roll-diaphragm compressor in staggered respective compression cycles.

18. A roll-diaphragm compressor system comprising:
   a first roll-diaphragm compressor as described claim 6,
   a second roll-diaphragm compressor as described in claim 6;
   a third roll-diaphragm compressor as described in claim 6;
   an architecture that holds the first, second and third roll-diaphragm compressors in an offset opposing configuration without any of the diaphragm compressors being aligned along a common axis; and
   a piston assembly disposed between the first, second and third roll-diaphragm compressors configured to drive a respective first, second and third piston head of the first, second and third roll-diaphragm compressors.

19. A method of driving a roll-diaphragm compressor comprising:
   providing a roll-diaphragm compressor having a flexible roll-diaphragm coupled with an edge of a compressor body that defines a concave portion having a convex interface wall and a planar apex portion adjacent to the concave portion, the roll-diaphragm and convex interface wall defining a compression chamber;
   driving the roll-diaphragm to a first concave configuration wherein the roll-diaphragm is spaced apart from the convex interface wall such that the compression chamber is at a maximum volume; and
   driving the roll-diaphragm to a second convex configuration wherein the roll-diaphragm rollingly engages the convex interface wall such that the compression chamber is at a minimum volume.

20. The method claim 19, wherein said driving the roll-diaphragm to a first concave configuration draws a volume of fluid into the compression chamber via an inlet port of the compressor body.

21. The method claim 20, wherein said driving the roll-diaphragm to a second convex configuration expels the volume of fluid from the compression chamber.

* * * * *